June 23, 1942.  E. A. H. BOWSHER  2,287,164
ELECTRIC SIGNALING SYSTEM
Filed June 4, 1937
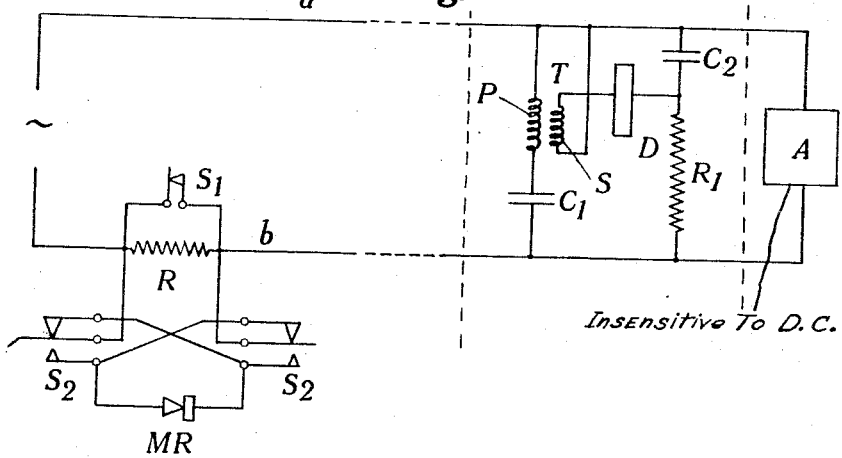
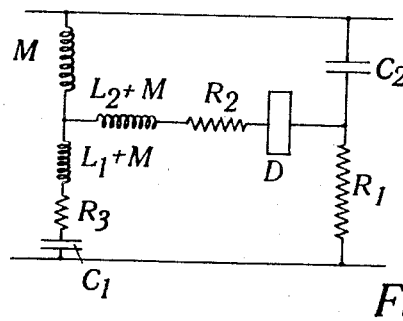
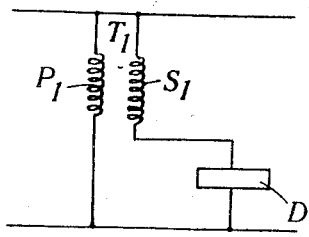
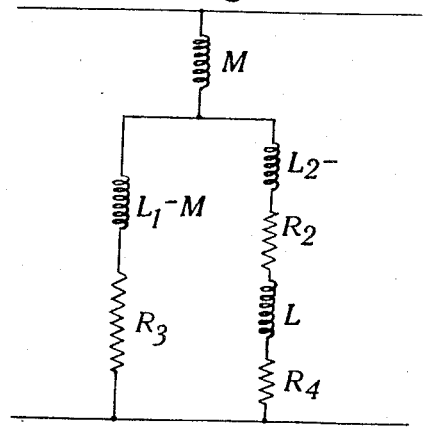
INVENTOR
E. A. H. BOWSHER
BY
*E. D. Phinney*
ATTORNEY Patented June 23, 1942

2,287,164

UNITED STATES PATENT OFFICE 2,287,164

ELECTRIC SIGNALING SYSTEM

Edward Albert Henry Bowsher, London, England, assignor to International Standard Electric Corporation, New York, N. Y.

Application June 4, 1937, Serial No. 146,451
In Great Britain June 19, 1936

5 Claims. (Cl. 177—352)

This invention relates to electric signaling systems in which a uni-directional current responsive device is operated over a circuit in which alternating current is normally flowing, as, for example, over an alternating current power circuit.

The main feature of the invention comprises an arrangement for signaling over a circuit traversed by alternating current characterised by a uni-directional current responsive device at one or more signal-receiving points, and, at a signal transmitting point, a resistance in the alternating current circuit, contacts short-circuiting the resistance, and means, connected in shunt to said resistance when the contacts are opened, whereby signals are transmitted to cause the operation of said unidirectional current responsive device.

Signals of two opposite kinds may be sent by reversing the direction of connection of said means. If it is desired to avoid the use of direct current at the signal-transmitting point, a rectifier can be used as said means as described below.

The invention will be more clearly understood from the following description taken in conjunction with the accompanying drawing in which:

Fig. 1 shows an arrangement according to the invention for signaling by a direct current component over an alternating current circuit;

Fig. 2 shows the equivalent electrical quantities of the portion of Fig. 1 between vertical broken lines;

Fig. 3 shows an alternative receiving circuit which may be substituted for the portion of Fig. 1 between vertical broken lines; and Fig. 4 shows the equivalent electrical quantities of the circuit of Fig. 3.

Referring now to Fig. 1, $ab$ are two wires constituting a circuit over which alternating current is continuously flowing. These may be the two wires of a single phase alternating current power system, or one of the wires of a three phase system and the neutral wire. In one of these wires $b$ there is inserted a resistance R shunted by a rectifier MR such as a dry contact metal rectifier. A key $S_1$ is provided for the purpose of signaling by direct current, and is normally closed as shown. When it is required to send a signal the key $S_1$ is operated. The alternating current flowing in the circuit $ab$ is not materially diminished when flowing in the forward direction of the rectifier MR, but when flowing in the reverse direction it is diminished by an amount determined by the resistance R. Thus more current flows in one direction than the other and the insertion of resistance R and rectifier MR gives rise to a condition which will affect any apparatus sensitive to direct current. A second type of direct current signal can be sent by reversing the rectifier MR by means of the key $S_2$.

The apparatus A is operated from the alternating current supply and is insensitive to direct current. The relay D responds to direct current, and by connecting it in the manner shown in the figure it may be made non-responsive to the alternating current traversing the wires $ab$. A transformer T is connected with its primary P connected in series with a condenser $C_1$ across the wires $ab$.

A condenser $C_2$ and resistance $R_1$ are connected in series across the wires $ab$, and the secondary S of the transformer T is connected in series with the relay D from the wire $a$ to a point between the condenser $C_2$ and resistance $R_1$. The network equivalent to the portion of Fig. 1 between the vertical broken lines is shown in Fig. 2 in which $L_1$ and $R_3$ are the inductance and resistance of the primary P, $L_2$ and $R_2$ the inductance and resistance of the secondary S, and M the mutual inductance between primary P and secondary S. No alternating current will flow in relay D if $$R_1(-j\omega M) = \left(-\frac{1}{j\omega C_2}\right)\left(R_3 + j\omega L_1 + j\omega M - \frac{1}{\omega C_1}\right)$$

i. e. if $$-j\omega M R_1 = \frac{-jR_3}{\omega C_2} + \frac{L_1}{C_2} + \frac{M}{C_2} - \frac{1}{\omega^2 C_1 C_2}$$

i. e. if $$L_1 + M = \frac{1}{\omega^2 C_1}$$

and $$R_1 = \frac{R_3}{\omega^2 C_2 M}$$

Thus the condensers $C_1$ and $C_2$ and the resistance $R_1$ may be adjusted in relation to the transformer so that the relay D is unaffected by alternating current traversing the wires $ab$.

If the circuit of Fig. 3 be substituted for the portion of Fig. 1 between broken lines, an exact balance of the alternating current is not obtained, but by a suitable design of transformer, the amount of alternating current traversing the relay D can be reduced to a negligible amount. This circuit is to be preferred for its simplicity, particularly where a large number of receiving points must be provided, as for example when it is required to control street lights from a remote point and to install a separate switching relay for the control of each light.

Fig. 4 shows the network equivalent to that of Fig. 3. In this figure $L_1$ and $R_3$ are the inductance and resistance of the primary $P_1$, $L_2$ and $R_2$ the inductance and resistance of the secondary, M the mutual inductance between them and L and $R_4$ the inductance and resistance of the relay D. The current through the relay D is given by the expression, the numeration of which is $$E(R_3+j\omega L_1-j\omega M)$$

where E is the voltage across the lines and the denomination of which is $$(j\omega M)(R_3+j\omega L_1-j\omega M)+(j\omega M)(R_4+R_2+j\omega L+j\omega L_2-j\omega M)+(R_3+j\omega L_1-j\omega M)(R_4+R_2+j\omega L+j\omega L_2-j\omega M)$$

The value of this expression may be reduced to a minimum by making $L_1$ equal to M and keeping $R_3$ to a minimum, having regard to the fact that $R_3$ also provides a direct current shunt across the lines. The inductance of relay D also limits the value of the alternating current flowing through it. We have found that for connection across power networks a transformer having a primary resistance of 15 ohms, a primary inductance of 80 henries, and a mutual inductance of 80 henries is suitable.

If the key $S_2$ is to be used to send direct current signals of opposite polarities, relay D may be a polarized relay which operates on a current in one direction and retains its armature in the thus operated position when the current is discontinued. The relay moves its armature to the opposite position in response to current in the reverse direction and retains it in that position until another operative current in the first direction is received.

Some specific uses for the circuit arrangements of this invention are shown and described in British Patents 495,057 of 1937, and 496,667 of 1937.

What is claimed is:

1. In an arrangement for signaling by direct current over a two-conductor circuit connected to an A. C. load and traversed by alternating current, a direct current responsive device comprising an electromagnetic relay connected on one side to one conductor of said circuit, and means rendering said relay independent of influence of said alternating current comprising a transformer primary bridged across said alternating current circuit and a transformer secondary coupled to said primary and connected at one end to the other side of said relay and at the opposite end to the other conductor of said circuit, the resistance of said primary winding being low, and the inductance of said primary winding being equal to the mutual inductance of said primary and secondary windings.

2. In an arrangement for controlling apparatus by direct current impulses over a loop circuit normally traversed by alternating current for energizing a useful load connected to the loop, a direct current responsive device comprising an electromagnetic relay, and means for coupling said relay to said circuit to render said relay independent of said alternating current comprising a transformer primary in series with a condenser connected across said circuit, a resistance and condenser in series connected across said circuit, a secondary winding of said transformer connected on one end to a conductor of said circuit and on the other end to one side of said relay, and a connection from the other side of said relay to a point between said resistance and series connected condenser, the condenser and resistance being so related to the transformer in value as to substantially prevent alternating current from flowing through said relay.

3. In an arrangement for signaling by direct current over a circuit connected to an A. C. useful load device and normally traversed by alternating current, a direct current responsive electromagnet control device connected to said circuit, and means to neutralize any substantial effect of the alternating current on said device, the last-mentioned means comprising a transformer having its primary winding bridged across said circuit and its secondary winding also bridged across said circuit in series with said electromagnet, the inductance of said primary winding being proportioned with respect to the mutual inductance of the primary and secondary windings so as to at least substantially neutralize the effect of said alternating current on said electromagnet.

4. An arrangement according to claim 3 in which said primary winding is connected in series with a condenser across said circuit and said secondary is connected in series with a resistance across said circuit, said resistance also being connected in series with a condenser across said circuit, and the impedance of said resistance and said two condensers being proportioned with respect to said mutual inductance and said primary winding inductance so as to render the said neutralizing more nearly complete.

5. An arrangement according to claim 3 in which said electromagnet and said windings are connected with other circuit elements to form a balanced alternating current bridge across said circuit, said electromagnet being connected across conjugate points of said bridge.

EDWARD ALBERT HENRY BOWSHER.